United States Patent [15] 3,662,095
Benmussa et al. [45] May 9, 1972

[54] A TELEGRAPH SIGNAL RECEIVING ARRANGEMENT FOR PERFORMING DETECTION AND PROCESSING OF SIGNALS ON INCOMING TELEGRAPH LINES

[72] Inventors: Henri Benmussa, Meudon; Ngoc-Sanh Bui, Hay-les-Roses; Gerard Troubac, Paris, all of France

[73] Assignee: International Standard Electric Corporation, New York, N.Y.

[22] Filed: Nov. 30, 1970

[21] Appl. No.: 93,910

Related U.S. Application Data

[63] Continuation of Ser. No. 810,276, Mar. 25, 1969, abandoned.

[30] Foreign Application Priority Data

Mar. 28, 1968 France ....................145858

[52] U.S. Cl. ....................178/3
[51] Int. Cl. ....................H04l 7/16
[58] Field of Search ....................178/3, 26 A

[56] References Cited

UNITED STATES PATENTS 3,366,737 1/1968 Brown, Jr. ....................178/53.1 R

*Primary Examiner*—Kathleen H. Claffy
*Assistant Examiner*—Thomas W. Brown

[57] ABSTRACT

The invention concerns improvements to telegraph character receiving systems in which a control block is designed to perform both the transition or change detecting operation on a plurality of lines and the transition processing operation. The control block will initially be switched into the transition detecting operation wherein it scans the lines to detect transitions, upon detection of at least one transition, a switching circuit operates and switches the control block into the transition processing operation wherein it operates to reconstitute the characters whereto each transition belongs. When the processing of the transition is completed, the switching circuit operates anew and again switches the control block into the transition detection operation. The alternate operating process enables the use, for transition processing operations, of a large proportion of the circuits used for the transition detecting operations, and thereby economical utilization of the equipment.

8 Claims, 9 Drawing Figures

*Inventors*
*HENRI BENMUSSA*
*NGOC-SANH BUI*
*GERARD TROUBAC*
*By* [signature]
*Attorney*

Inventors
HENRI BENMUSSA
NGOC-SANH BUI
GERARD TROUBAC
By [signature]
Attorney

FIG. 4 OPERATION OF CONTROL BLOCK DURING TRANSITION DETECTING

| | | | | |
|---|---|---|---|---|
| DT | 1 | | rz | 1→S11; B+1→B |
| | 2 | | | fdt = X3+X2+X1+X0+S11 |
| | 3 | fdt - $\overline{MTT}$ | | FDT=1; GI3-0 = $\overline{X3-0}$ |
| | 4 | fDT | $q^0$ | 0→A; 0→M; $\underline{1→Q}$ |
| | 5 | | $q^1$ | 0→I; 0→N |
| | 6 | S11 | $q^1$ | 0→X |
| | 7 | | $q^2$ | 1→DA; Ct1, X3-0→A(MGR); EET=0; 0→S11 |
| | 8 | | | EN15-0→N15-0; EP15-0→I15-0 |
| | 9 | | FOM | MGR→M20(a), M16(v), M15-0(EA); 0→DA |
| | 10 | | $q^3$ | M20→N20(a); M16→N16(v) |
| | 11 | | $q^4$ | TMi = $\overline{M}$i.Ii.$\overline{N}$i + Mi.$\overline{I}$i.Ni(NEA) |
| | 12 | | $q^4$ | TIi = Mi.$\overline{I}$i.Ni + Ii(Mi+Ni)(LA); LAP=I15+I14+... |
| | 13 | LAP | $q^5$ | 1→DA; 1→OM; $\underline{1→MTT}$; $\underline{0→Q}$ |
| | 14 | | FOM | M→MGR; 0→DA; 0→OM |
| | 15 | $\overline{LAP}$ | $q^5$ | X+1→X; $\underline{0→Q}$ |
| | 16 | | | |
| | 17 | | | |
| | 18 | | | |
| | 19 | | | |
| | 20 | | | |

FIG. 6

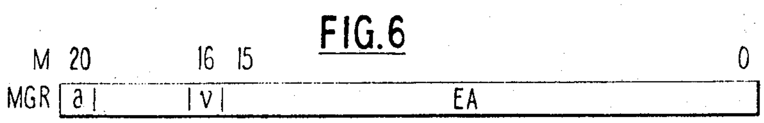

FIG. 7

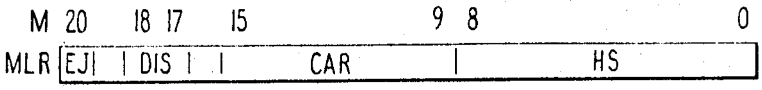

Inventors
HENRI BENMUSSA
NGOC-SANH BUI
GERARD TROUBAC
By [signature]
Attorney

FIG. 5 OPERATING OF CONTROL BLOCK DURING TRANSITION PROCESSING

| | | | | |
|---|---|---|---|---|
| TT | 1 | | | X3-0=NGL; I15-0=LA; N20=a; N16=v; FTT=1 |
| | 2 | | $q^0$ | 0→A; 0→M; 0→N14-0 |
| | 3 | N16(v) | $q^1$ | NLA→N13-10; B10-2→N8-0(HT) |
| | 4 | $\overline{N16}$(v) | $q^1$ | NLA→N13-10; B8-0→N8-0(HT) |
| | 5 | | $q^2$ | 1→DA; Ct2, X3-0, N13-10→A(MLR) |
| | 6 | | FOM | MLR→M20(EJ),M18-17(DIS),M15-9(CAR),M8-0(HS);0→DA |
| | 7 | | $q^3$ | N8-0→M8-0→N8-0(HT-HS) |
| | 8 | | $q^4$ | RCN→M15-9(CAR); MJD→M18-17(DIS) |
| | 9 | | $q^4$ | TM 20=$\overline{M20}$.$\overline{N8}$.$\overline{N7}$.$\overline{N6}$.$\overline{N5}$(N20+$\overline{N20}$.$\overline{N4}$)(FS) |
| | 10 | EJ+N8-4⩾01001 | $q^4$ | 1→N14 (NS) |
| | 11 | | $q^5$ | 0→N8-0 |
| | 12 | $\overline{NS}$ | $q^5$ | 1→DA; 1→OM; 0→Ii (NLA) |
| | 13 | | FOM | M→MLR(EJ, DIS, CAR, HS); 0→DA; 0→OM |
| | 14 | $\overline{NS}$ | $q^6$ | 0→Q |
| | 15 | $\overline{LAP}$ | $q^6$ | X+1→X; 0→MTT |
| | 16 | NS, N16 | $q^6$ | 0→M8-0; B10-2→N8-0(HT) |
| | 17 | NS, $\overline{N16}$ | $q^6$ | 0→M8-0; B8-0→N8-0(HT) |
| | 18 | | $q^7$ | 1→M3 (DM) |
| | 19 | N20(a) | $q^7$ | 1→M5 (DM) |
| | 20 | | $q^8$ | N8-0→M8-0→N8-0(HS=HT-DM) |
| | 21 | | $q^9$ | 0→M8-0 |
| | 22 | | $q^{10}$ | N8-0→M8-0(HS) |
| | 23 | | $q^{11}$ | 0→N9-0 |
| | 24 | | $q^{12}$ | M20-M18-M17, M15-9→N19-0(EJ, DIS, CAR) |
| | 25 | M20 | $q^{12}$ | 0→N14 (NS) |
| | 26 | $\overline{NS}$ | $q^{13}$ | 0→Ii (NLA) |
| | 27 | | $q^{13}$ | 1→DA; 1→OM; 0→M20, M18-17, M15-9 (EJ, DIS, CAR) |
| | 28 | | FOM | M→MLR(0...0, HS), 0→DA, 0→OM |
| | 29 | | $q^{14}$ | 0→A; 0→M |
| | 30 | $\overline{NS}$ | $q^{14}$ | 0→Q |
| | 31 | LAP | $q^{14}$ | X+1→X; 0→MTT |
| | 32 | | $q^{15}$ | 1→DA; ct3→A (CS) |
| | 33 | | FOM | CS→M (ACER); 0→DA |
| | 34 | | $q^{16}$ | 1→DA, 1→OM; M6-0+1→M6-0(ACER+1) |
| | 35 | | FOM | M→CS(ACER+1), 0→DA; 0→OM |
| | 36 | | $q^{17}$ | 0→A |
| | 37 | | $q^{18}$ | M→A (ACER+1) |
| | 38 | | $q^{19}$ | 0→M; 0→Ii(NLA) |
| | 39 | | $q^{20}$ | 1→DA; 1→OM; N8-0, X3-0, N13-10→M(DIS, CAR, NGL, NLA); 0→Q |
| | 40 | | FOM | M→ACER+1(DIS, CAR, NGL, NLA); 0→DA; 0→OM |
| | 41 | $\overline{LAP}$ | $q^{20}$ | X+1→X; 0→MTT |
| | 42 | | | |
| | 43 | | | |
| | 44 | | | |

Inventors
HENRI BENMUSSA
NGOC-SANH BUI
GERARD TROUBAC
By [signature]
Attorney

Inventors
HENRI BENMUSSA
NGOC-SANH BUI
GERARD TROUBAC
By [signature]
Attorney

A TELEGRAPH SIGNAL RECEIVING ARRANGEMENT FOR PERFORMING DETECTION AND PROCESSING OF SIGNALS ON INCOMING TELEGRAPH LINES

This is a continuation of application Ser. No. 810,276, filed Mar. 25, 1969, now abandoned.

BACKGROUND OF THE INVENTION

The present invention relates to improvements to telegraph signal receiving systems and, more particularly, to such systems being associated with telegraph lines, in order to detect the signals appearing on those lines, process the detected signals and then reconstitute the telegraph characters received on each line.

The improved telegraph signal receiving system of the invention can be applied in telegraph message receiving or switching centers, in telegraph automatic exchanges or in any other similar installation.

The transmission of telegraph messages is usually performed by means of signals which can take either of two values called hereinafter 0 and 1. Transmission is done on a one character at a time basis. A character always includes a beginning-of-character signal called "START," several significant signals or unit-elements and an end-of-character signal called "STOP." The "START" has a unitary time-length and its value is always 0. The number of unit-elements varies from 5 to 8 according to the alphabet which is used. Each unit-element has a unitary time-length and its value is 0 or 1 according to the transmitted information. The length of a "STOP" is equal to 1, 1.5, or 2 unit-elements according to the alphabet. .Its value is always 1. Between the characters, if transmission is according to start-stop telegraphy, the value of the transmitted signal remains 1; the line remains in the state corresponding to the "STOP" of the last transmitted character. The time-length of a unit-element is defined by the transmission speed having been adopted. At 50 Bd, a unit-element lasts for 20 ms. At 200 Bd, it lasts for 5 ms.

The reception of telegraph signals involves two operations: observation of the line in order to detect, in the course of time, the value of the received signals, and processing of the data resulting from the line observation, by means of an appropriate time scale, in order to determine the value of every particular unit-element and to reconstitute the received characters.

Observation need not be permanent. The state of the line has just to be observed periodically for a very short period of time. The frequency of observation must take the time-length of the unit-elements into account as well as possible distortion. Moreover, there is a possibility of comparing the result of each observation with that of the previous observation, in order that only the changes, or transitions, from one state to another should be made apparent. At the beginning of a character, there always occurs a transition from state 1 to state 0. Then, the direction of transitions alternates. The term transition as used herein indicates a change on a line from a 1 state to a 0 state and vice versa.

The above mentioned remarks are taken into account in a telegraph signal receiving system which is described in the French Pat. No. 1,386,330, filed on Nov. 20, 1963, Ser. No. 954,410, in the name of the Applicant, for: "Electric signal receiving system applicable in particular to telegraph exchanges"; and the corresponding British Pat. is No. 1,022,990. This system comprises mainly a plurality of lines, a transition detecting block, a storage memory and a clock. By means of a scanner, the detecting block initiates a cyclical observation of the lines. It simultaneously inquires into the memory about the previous states of the lines, having been registered at the time of the previous observation. A mere comparison enables making the transitions apparent. Everytime it detects a transition, the detecting block generates a transition indication which includes, among other things, the identity of the line and the time of occurrence of the transition, as supplied by the clock. Said transition indication is stored in a memory cell of a waiting queue for transitions.

In fact, to the purpose of saving time, the detecting block scans the lines not on the basis of one at a time, but by groups of several lines, and a transition indication set in queuing file contains, in addition to the time, the number of the group and the rank of the lines having changed their state.

The system described also includes a transition processing block for reconstituting characters, and a line memory particular to each line. This block reads a transition indication out of the transition waiting queue. For each transition, it obtains the number of the line having changed its state and reads the corresponding line memory. Said memory contains, in particular, a time of origin indication established as from the first transition of the character (at the beginning of the "START") , and also already reconstituted unit-elements of the character. By withdrawing the time of origin from the time of the transition to be processed, the block calculates the location of the transition in the character; the transition is located, for instance, between the second and third unit-elements. If there has been no transition since the "START," the unit-elements preceding the transition have the same value as the "-START," that is "0." The following unit-elements will be 1, until another transition occurs. At this stage of operation the reconstituted character is therefore 00111 (5-unit character). When receiving a further transition (after the fourth unit-element for instance), the block will keep the unit-elements previous that transition and it will reverse the following ones. This will result in 00110, in the considered example. Besides, the transition processing block also contains means for establishing the time of origin of a character, upon occurrence of a "START," and for registering the fully reconstituted characters, together with the line identity, into an outlet waiting queue, to the purpose of their being used by other equipment.

The improved system forming the subject of this invention preserves the distinction-which was made in the system described in the already cited French Pat. No. 1,386,330-between the function of detecting transitions and the function of processing them; it also preserves the principle of detecting transitions by comparing the present state of each line with a previous registered state, and also the principle of processing transitions by comparing their time of occurrence with a time of origin.

SUMMARY OF THE INVENTION

An object of the invention is to provide a telegraph signal receiving system which is more economical than the previous one as relates to the necessary circuits for performing these two functions, and more efficient as relates to the total time of occupation of the circuits to the benefit of each particular line.

Another object of the invention is to provide a system which is designed especially to be applied in average size telegraph centers whereto there are connected lines operated with different speeds of transmission and various alphabets. It therefore includes simple means for processing a great variety of signals such that a kind of averaging of the traffic can occur and increase efficiency with respect to the utilization of time.

A feature of the invention is concerned with a telegraph signal receiving system comprising mainly a plurality of lines, a control block provided for performing a transition detecting function as well as a transition processing function, and a switching circuit, said different means being arranged in such way that the control block is initially switched onto the transition detecting function wherein it scans the lines, with a view to detecting transitions; as soon as at least one transition has been detected, the switching circuit operates and switches the control block onto the transition processing function wherein it undertakes to reconstitute the character to which each transition belongs; when processing of the transition(s) is over, the switching circuit operates again and switches the control block onto the transition detecting function; such alternate operation enables using, for transition processing operations, a large proportion of the circuits already used for transition detecting operations, so that an economical construction is obtained.

Another feature of the invention lies in the fact that the control block includes mainly: a generator delivering impulses cyclically recurring at regular time intervals; a scanning counter controlling a scanner which is used for observation of the state of the lines; also, controlling means so arranged that, during the transition detecting function, a cyclically recurring pulse sets the scanning counter in an initial position, and then the scanning of the lines, by means of the scanner, begins with the lines having the highest transmission speed — called the fastest lines — and continues with lines of lesser and lesser speed, until a new cyclical impulse resets the scanning counter to its initial position, or until all the lines have been scanned, so that, during the time provided for a cycle, the fastest lines are always scanned, whereas, a great number of transitions have been detected and the scanning consequently takes more time, only the last lines of lesser speed are not scanned.

Still another feature of the invention lies in the fact that the intervals between cyclically recurring pulses, defining the time-length of scanning cycles, are equal to the maximum time interval of observation of the fastest lines, since these lines are scanned first and will for certain be scanned once per scanning cycle.

Yet another feature of the invention lies in the fact that the total number of lines is chosen according to the incoming traffic they handle and to the processing capacity of the control block, so that the latter can perform a full scanning cycle, up to the last line, often enough to meet the requirements of less speedy lines.

A further feature of the invention lies in the fact that, in the transition detecting function, the control block scans the lines by groups, with a view to simultaneously detecting the transitions for all the lines of one group, and in the fact that, when several transitions are detected in one group, means are provided so that the control block shall repeatedly perform the transition processing function in a successive manner and each time process one of the detected transitions, until all of them have been processed, whereupon the control block reverts to the transition detecting function.

Other features of the invention lie in the fact that the control block, for the purposes of transition detecting function, includes in particular: said scanning counter which each time designates a group of lines and orientates the scanner; a present-state register which receives, from the scanner, the present-states of the lines of a group; circuits enabling to read, in a memory, a memory cell belonging to the group of lines concerned; a register memory which receives a group word being read out of said memory cell and supplying, in particular, the previous states of the lines of the group, having been registered during the preceding scanning; circuits which combine the present and previous states, one by one, and supply a transition condition for any line having changed its state; a transition register which may be the same as the present-state register and receives and registers transition conditions; and also a detecting circuit controlled by the transition register and supplying a call signal when at least one transition has been detected, thus controlling said switching circuit to operate in order to cause switching over from the transition detecting function to the transition processing function.

Accordingly, another feature of the invention lies in the fact that all the lines of one group being operated with the same alphabet and transmission speed, said group word also provides an indication characterizing the alphabet, as well as an indication characterizing the speed of the lines of the group, means being provided for registering said indications, to the purpose of their being used for the processing of transitions if any.

A still further feature of the invention lies in fact that the control block, for the requirements of the transition detecting function, also comprises other circuits which combine the present and previous states of the lines, one by one, and modify the group word written on the memory register, so as to replace the previous state of each line by its present-state, and also means permitting registration of the group word thus updated, in place of the read out one.

A still further feature of the invention lies in the fact that, in case the detecting circuit does not supply a call signal, the switching circuit remains in the same position, means then being provided in the control block to cause the scanning counter to step once and to initiate the transition detecting function again, to the purpose of scanning the following line group.

Yet a further feature of the invention lies in the fact that the control block, after being switched on to the transition processing function, identifies one of the lines having changed its state, as a result of the information element supplied by the transition register, performs known per se operations concerning the processing of the transition detected on the lines and, then, removes the transition condition concerning this line from the transition register; if the detecting circuit goes on delivering the call signal, the switching circuit remains in the same position and means are provided in the control block which start the transition processing function again, to the purpose of processing another transition, whereas, if the detecting circuit ceases delivering the call signal, the switching circuit operates and switches the control block on to the transition detecting function.

And a feature of the invention lies in the fact that, the operations for processing a transition taking place with reference to an appropriate time scale, there is provided, in the control block, one or more clocks supplying as many time indications as there are transmission speeds, means being moreover provided for selecting the time indication to be taken in consideration as a function of said transmission speed indication having been registered during the performance of the transition detecting function, which enables processing lines operated at different transmission speeds on an economical basis.

In the already cited French Pat. No. 1,386,330, a memory cell is associated with each line and contains a line word. Said line word includes the elements of a character in process of reconstitution, as from the transitions detected on the line, and a time of origin reckoned as from the time of occurrence of the first transition of that character, at the beginning of the "START."

Moreover, the lines can be operated with different alphabets. The latter differ essentially by their number of significant unit-elements. It is moreover recalled that all the lines of a group are operated with the same alphabet and that, during the detection of transitions, an alphabet indication supplied by the group word is registered into the control block.

Therefore, a feature of the invention lies in the fact that the control block, when processing the first transition of a character and calculating a time of origin, as from the time indication corresponding to such transition, includes means for withdrawing, from said time indication, a value that varies as a function of said alphabet indication, in order that, whatever the alphabet, the "STOP" should always have the same location with regard to the time of origin, and that the useful significant unit-elements of all the alphabets should always occupy the same place when considering them in the reverse order, that is as from the "STOP."

BRIEF DESCRIPTION OF THE DRAWINGS

Other features will become more apparent and the invention itself will be best understood from the following description together with reference to the accompanying drawings in which:

FIG. 4, a table complementary to the diagram of FIG. 3 and describing in detail the operation of control block BL while performing a transition detecting function;

FIG. 5, a table complementary to the diagram of FIG. 3 and describing in detail the operation of control block BL while performing a transition processing function;

FIG. 6, a group word;

FIG. 7, a line word;

DESCRIPTION OF THE PREFERRED EMBODIMENTS

Figure 1:
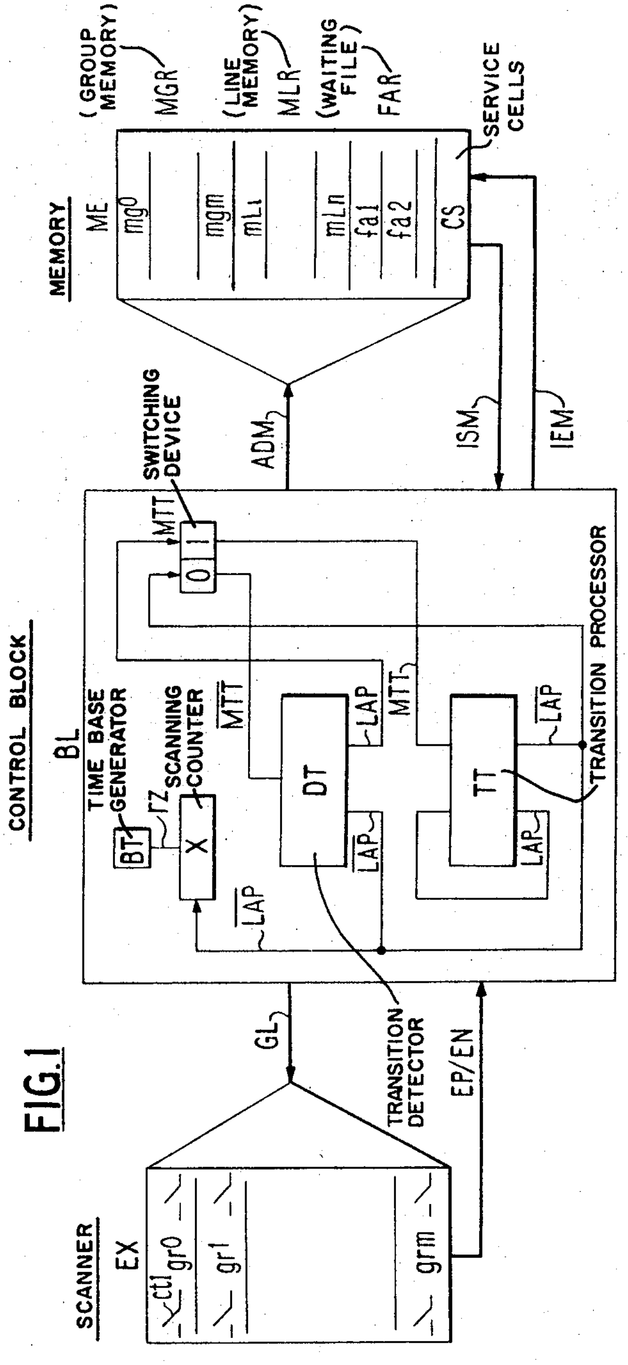
FIG. 1, the block diagram of an example of embodiment of the improved telegraph signal receiving system of the invention.

There will be first described, with reference to FIG. 1, the block diagram of an example of embodiment of the improved telegraph signal receiving system of the invention.

The system forming the subject of the invention includes three main elements. The first one is a scanner EX enabling observing the states of telegraph lines each of which is symbolized by a contact such as *ct*1. The position of the contact characterizes the state of the line. It is closed, for instance, when the line is in state 1, and open when in state 0. The various lines are set by groups, *gr*0, *gr*1 . . . *grm*. The number of lines in each group varies according to the application. All the lines of one group have the same speed. On the other hand, the speed is not the same for the various groups and the latter are filed in decreasing order of speed. Group *gr*0 is made up of lines with the highest speed, 200 Bd for instance. Group *grm* is made up of lines with the slowest speed, 50 Bd for instance.

Scanner EX is orientated onto a line group which is determined by an indication it receives over conductors GL. In exchange, it supplies an indication characterizing the states of the lines of the group, over conductors EP/EN.

The second element of the system of the invention is memory ME. This memory which can be of the usual ferrite core type, mainly includes a group memory MGR, a line memory MLR, a waiting queue FAR and service cells CS. The group memory MGR consists of a succession of memory cell *mg*0 to *mgm* which are assigned in the same order to the groups of lines *gr*0 to *grm*. Line memory MLR consists of a succession of memory cells *m*L1 to *m*L*n* which are assigned in the same order to the telegraph lines. The waiting queue FAR is made up of a succession of memory cells such as *fa*1, *fa*2 each of which is used to register a reconstituted character and the number of the line whereat that character was received, to the purpose of any utilizing equipment such as a message switching center. Service cell CS is used as a waiting queue indicator. Its contents indicates, at any instant, which memory cell in waiting queue FAR must be used for the next writing.

To each memory cell there corresponds an address. Upon delivery of an address on conductors ADM, the corresponding memory cell is read out and its contents, known as a "word," is displayed on conductors ISM. In the same manner, upon delivery of an address on conductors ADM and also a word on conductors IEM, the word is registered in the memory cell corresponding to the address.

The third element of the system of the invention is the control block BL. Said block, which handles the information delivered by scanner EX and memory ME, provides, on the one hand, for the function of detecting the states of the telegraph lines and making the transitions therein apparent and, on the other hand, for the function of processing the transitions so detected and reconstituting the characters received on each line.

With a view to rendering the main features of the inventive telegraph signal receiving system more clear, block BL has been represented under a form which is more functional than physical. In effect, rectangle DT represents all the circuits used for detecting transition on the telegraph lines. Rectangle TT represents all the circuits used for processing the transitions revealed by circuits DT. In other words, rectangle DT represents the transition detecting function, DT, and rectangle TT the transition processing function, TT, independently from the fact that, in the physical embodiment, most of the circuits used for the detection of transitions are used also for processing them. For completion, there is also shown a scanning counter X, a time basis signal generator BT and a switching device taking the form of a flip-flop circuit MTT.

It will be assumed that initially flip-flop circuit MTT is in position O and delivers a signal on conductor $\overline{\text{MTT}}$ which sets function DT in service. Scanning counter X is in position O.

Function DT first consists in transmitting the indication supplied by counter X over conductors GL, so as to orientate scanner EX and obtain the states of the lines in the corresponding group, over conductors EP/EN. Counter X being in position O, this group is *gr*0. At the same time, a memory address is formed by means of the indication supplied by counter X. This address which is transmitted over conductors ADM enables reading memory cell *mg*0 which corresponds to line group *gr*0. The read out group word is forwarded from memory ME to block BL, over conductors ISM.

Block BL is thus informed of the present states of the lines of group *gr*0, by scanner EX, and of the previous states of those lines, having been registered into memory cell *mg*0 during the preceding scanning. Block BL compares these two information elements and establishes transition conditions indicating which lines have changed their state. If none of the lines in group *gr*0 has changed its state, the transition conditions are null. The contents of memory cell *mg*0 is not modified. A signal $\overline{\text{LAP}}$ is transmitted to counter X so that it should step once. Counter X responds by displaying the number of the following group, *gr*1. Immediately after it is completed, function DT is started again automatically since flip-flop circuit MTT still is in position O. It is thus repeatedly carried out for the successive groups of lines so long as no transition has been detected.

It will be assumed now that, during the scanning of group *gr*0, the comparison of the present with the previous states provides non null transition conditions, two lines having changed their state. Function DT provides, in that case, for the up-dating of memory cell *mg*0, by writing therein the present states of the lines as supplied by scanner EX, in place of the previous states precedently read out. On another hand, function DT does not supply signal $\overline{\text{LAP}}$ but supplies signal LAP. Counter X remains in position O whilst flip-flop circuit MTT is set to position l.

Due to this, flip-flop circuit MTT delivers a signal on conductor MTT instead of on conductor $\overline{\text{MTT}}$; the control block does not repeat function DT but proceeds to the carrying out of function TT.

The just completed function DT enabled the establishment of transition conditions indicating on which lines in group *gr*0 a transition has been detected. Right at the beginning of function TT, block BL uses these conditions and the position of counter X-still designating the *gr*0 group — in order to form the address of the line memory cell, *mL*1 for instance, of the first line having changed its state. This line memory is read out and the line word it contains supplies information on the previous states of the line (time of origin of the character, unit-elements already reconstituted, etc.), which will enable block BL to effect processing operations for the completing the reconstitution of the character of which the detected transition is a unit-element. The detail of these operations will be given further on.

When function TT performed with respect to the first one of the two detected transitions is over, the corresponding transition condition is cancelled and function TT is finished. However, there remains a transition condition and the previously mentioned signal LAP is still supplied, whereas signal $\overline{\text{LAP}}$ is absent. Due to this, flip-flop circuit MTT remains in position 1 and function TT is simply re-started. It then permits the second transition to be processed.

At the time when the processing of the second transition is over in its turn, the corresponding transition condition is cancelled. Since there is not any other transition, signal LAP disappears and signal $\overline{LAP}$ appears. This resets flip-flop circuit MTT and controls counter X to step once.

Since flip-flop circuit MTT is returned to position 0, block BL is now goint to return to function DT and counter X having stepped once will control the following group of lines to be scanned.

Operation of the line block BL thus proceeds, by alternately passing from the detection of transitions to the processing of the detected transitions, according to the state of the lines scanned. A first illustration of this alternate operation will be found on line XI of FIG. 2, which describes a first example of the functions performed by line block BL in the course of time.

Function DT performed for group *gr*0 is noted DTO. DT1 and DT2 are then found for groups *gr*1 and *gr*2, etc. It has been assumed that no transition was detected in groups *gr*0 (DT0) and *gr*1 (DT1), but that two transitions are detected in group *gr*2. Due to this, function DT2 is followed by function TT21, being the processing of the first transition of group *gr*2, then by function TT22, being the processing of the second transition of the same group. Then, block BL returns to function DT for groups *gr*3 and *gr*4 (DT3 and DT4), processes a transition of group *gr*4 (TT41), etc. The time allowed for this operation, as from the instant of origin noted *or*, is limited by a signal *rz* delivered at regular intervals by the time basis signal generator BT. This signal *rz* has for result of modifying the operation of counter X, so that instead of controlling it to step once, signal $\overline{LAP}$ resets it to position 0. Therefore, operation of block BL is reset to origin and begins again by the scanning of group *gr*0. The time that lapses between instants *or* and *rz* thus is practically the interval between two signals, *rz*.

Figure 2:
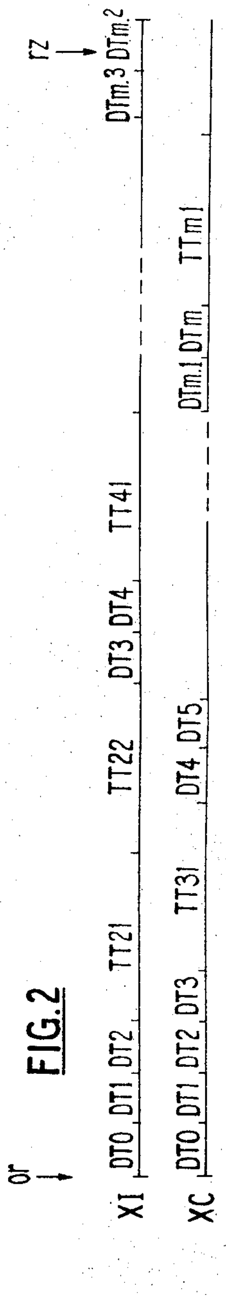
FIG. 2, illustration of a timing operation of the system of FIG. 1.

On line XI of FIG. 2 it has been assumed that, owing to the great number of transitions to be processed, signal *rz* presents itself while function DTm-2 is being performed, i.e., while the transitions are being detected for group *grm*-2. The last two line groups are therefore not scanned, for lack of time.

On line XC of FIG. 2 there will be found an opposite example of operation of block BL according to which, the transitions detected being less numerous, all the groups are scanned before instant *rz*. Operation of the system is then suspended by non represented means.

Thus, all the line groups are not scanned at each cycle. But since as already described, the line groups are filed by decreasing speeds with respect to the scanning, this does not present any inconvenience, as will now be shown.

Effectively, the lines of the first group *gr*0 are the instance operated at 200 Bd. The time-length of a unit-element is 5 ms. In order to locate the transitions with sufficient precision, the state of each line should be observed a certain number of times during each unit-element (usually 16 times). The frequency of observation of the first group lines must therefore be 16 times every 5 ms, that is a period of approximately 312$\mu$s. On account of this, to comply with the requirements of the fastest lines, the time of a scanning cycle must be at most 312$\mu$s, and time basis signal circuit BT will produce signals *rz* at intervals of 312$\mu$s. Since the fastest line groups are scanned at the beginning of a cycle they will be scanned for certain once every 312$\mu$s, which meets the requirements.

On the other hand, the lines of the last group are operated, e.g., at 50 Bd and the time-length of a unit-element is 20 ms. At the rate of 16 observations per unit-element, the minimal observation interval is 1,250$\mu$s. It is immediately seen that, to respect this interval, the scanner must go up to the last group but one out of four times only.

There is a probability (*p*1) that the transitions having been detected during the scanning of the fastest lines prevent the scanning of a slow lines, during a cycle. On the other hand, the probability (*p*2) that the detected transitions prevent the scanning of slow lines during four consecutive cycles is comparatively far less important. This statement can be illustrated in a simple way: if all the lines of a group change their state at a time, during the next cycle, the scanning will detect as many transitions as there are lines in the group, but the lines will remain in their new state at least for the 15 following cycles and the scanning will not detect any other transition for that group. Consequently, in general, if the number of transitions detected on fast lines is abnormally large during a cycle, which prevents the scanning of the last groups of slow lines, it will have a tendency to be small during the following cycles and all the slow lines will thus be scanned. In a way, the traffic peaks of fast lines are absorbed, without requiring any particular precaution or over-dimensioning of the control block, owing to the fact that the scanning of slow lines can be temporarily omitted.

Figure 3:
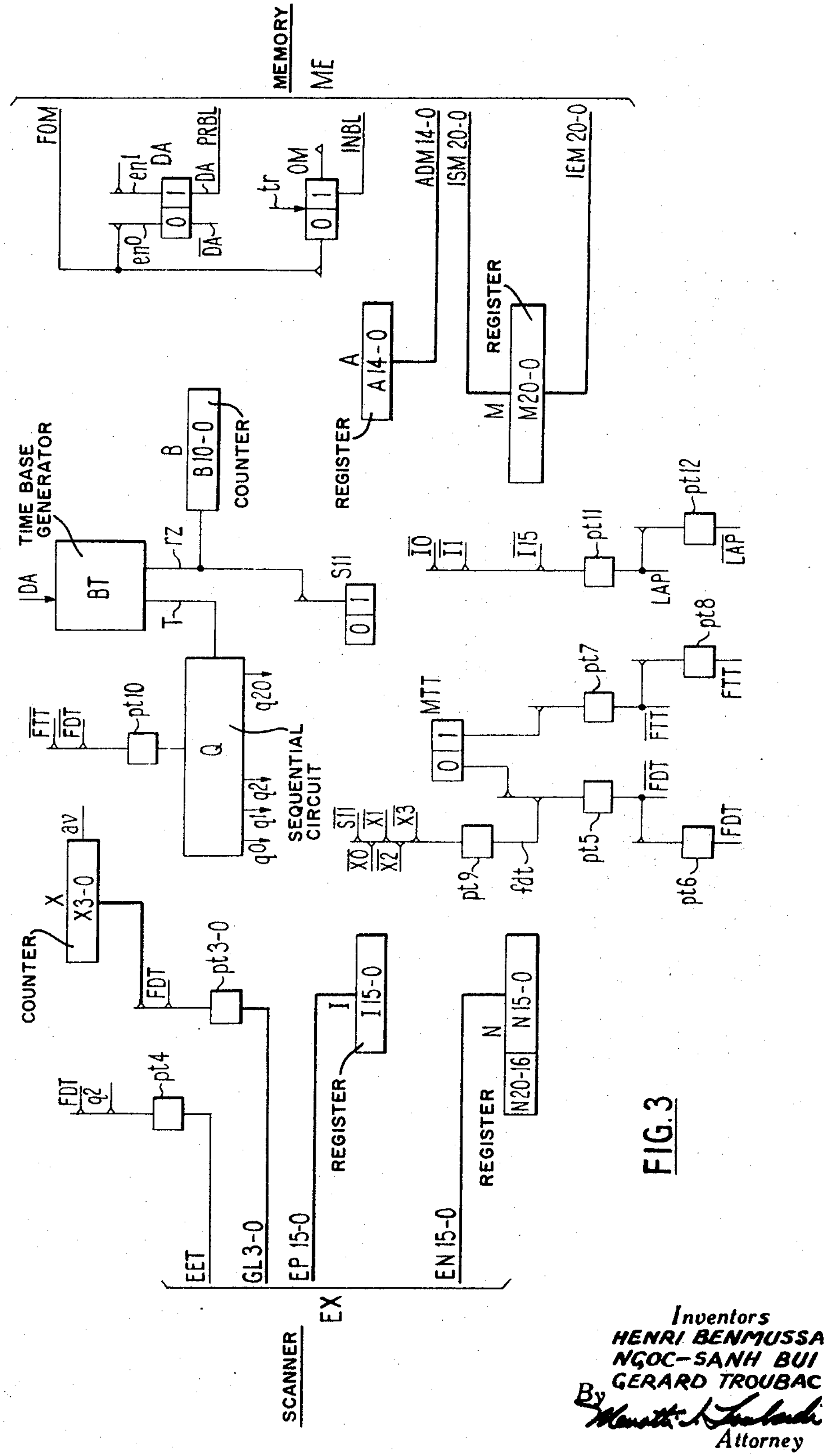
FIG. 3, the simplified circuit diagram of an example of embodiment of the control block BL of FIG. 1.

An example of embodiment of the control block BL of FIG. 1 is now going to be described, with reference to FIG. 3.

This control block includes registers (A, M, I, N), counters (X,B), a time basis signal generator BT, a sequential circuit Q and various logical circuits which are partly represented on FIG. 3.

The logical circuits are realized chiefly by means of gate circuits, flip-flop circuits and binary counters of the "NAND" type.

A gate such as *pt*9 supplies signal *fdt* and is represented by a square having, in its upper part, an input conductor whereto one or more inlets are connected via small triangles. These inlets are decoupled with respect to one anothers (the small triangles represent decoupling diodes). The outlet is located at the lower part. The gate delivers a signal null (earth) when all its inlets are positive. If one at least of its inlets is not positive (i.e., if it is earthed), it delivers a positive signal. It will be said that gate *pt*9 supplies condition *fdt* when its outlet is positive. Otherwise, condition *fdt* is absent, which will occur when conditions $\overline{X3}$, $\overline{X2}$, $\overline{X1}$, $\overline{X0}$, $\overline{S11}$ controlling gate *pt*9 are simultaneously present.

A flip-flop circuit such as DA is represented by two squares placed side by side and containing digits 0 and 1. Two input conductors *en*0 and *en*1 are provided at its upper part with one or more inlets connected thereon, in the same way as for the gates. In the idle position, the inlets of the flip-flop circuit receive positive signals. The two outlets of the flip-flop circuit, DA and $\overline{DA}$,are placed at the lower part. When the flip-flop circuit is in position 0, it delivers a positive signal on outlet $\overline{DA}$ and a signal null (earth) on outlet DA. To set it to position 1, a signal null is sent over input conductor *en*1. The output signals are then permutated. To reset it again, an earth has just to be supplied on input conductor *en*0 (over conductor FOM). The duration of input signals does not matter. The flip-flop circuit changes its state immediately at the beginning of the input signal, within a very short time that can be considered as null.

It will be considered that a binary counter is but a particular flip-flop circuit such as OM, which has an additional inlet *tr* and two inlets such as those of flip-flop circuit DA, although they are placed laterally. Its outlets are the same as those of a flip-flop circuit. Flip-flop circuit OM triggers, whatever its position, when a transition occurs on its inlet *tr* between a positive voltage level and a null voltage level. This change of position occurs more precisely at the end of a positive control impulse.

The registers are groups of flip-flop circuits or binary counters of the described types. Thus, register A is comprised of 15 flip-flop circuits A14–0. Register M consists of 21 binary counters M20–0. Register I consists of 16 binary counters I15–0 and register N of 21 flip-flop circuits.

Counters X and B are realized by means of binary counters of the described type. Counter X has four stages X3–0 and stands as a scanning counter which supplies a 4-bit binary number and can take 16 separate positions. The binary number contained in counter X is increased by one unit everytime a control represented by *av* is being supplied. Counter B is similar. It has 11 stages B10– and progresses under the control of signal *rz*. It is used as a clock.

Time basis generator BT is a circuit that produces, on one hand, impulses T having a period of e.g. 1 microsecond and being used for controlling the execution of elementary operations in block BL. It also delivers signals of short duration *rz*, at intervals of 312μs. Time basis generator BT operates freely and permanently, so long as it does not receive condition DA from flip-flop circuit DA. It will be seen that such condition is supplied when block BL has asked for a read or write operation out of or in memory ME. At this instant, condition DA disables one part of time basis generator BT, that is the part delivering impulses T. This enables suspending the operation of block BL as long as memory ME has not performed the requested operation.

Sequential circuit Q is a circuit which receives impulses T and delivers, in exchange and successively, time impulses *q*0, *q*1, *q*2 . . . *q*20. It can be realized in the form of a counter with decoding circuits. At the beginning of each function, sequential circuit Q starts from position 0 (*q*0). The first T pulse results in a time impulse *q*0. At the end of impulse *q*0, the counter steps to position 1. The second impulse T will likewise supply time impulse *q*1, and so on. Sequential circuit Q therefore progresses step-by-step automatically, until a control resets it to position 0 when the function is over. When block BL has no function to fulfill, which is indicated by the absence of both conditions FTT and FDT or rather by the presence of $\overline{FTT}$ and $\overline{FDT}$, gate *pt*10 operates and delivers an earth that inhibits the operation of sequential circuit Q so that it should stop using impulses T and delivering time impulses.

Control block BL receives information from memory ME and from scanner EX as already described. It processes this information and writes the results of the processing into memory ME.

For communicating with memory ME, block BL includes flip-flop circuits DA and OM, address register A and memory register M. When block BL must read a cell of memory ME, the address (15 bits) is written in register A which displays it on conductors ADM14–0, towards memory ME. Flip-flop circuit DA is moreover set by a control not represented. It transmits a call signal over conductor PRBL. In response to this call signal, and as soon as it is available, memory ME does the requested read out operation and delivers the read out group of data, or word, of 21 bits onto conductors ISM20–0. This word gets written onto register M. When the read out operation is completed, memory ME also supplies an earth onto conductor FOM. Flip-flop circuit DA is then reset in order to cause the call to memory ME to cease.

When block BL must register a word into memory ME, the address is written into register A, the word to be registered is written into register M and flip-flop circuits DA and OM are set. The address is displayed on conductors ADM14–O, the word to be registered is displayed on conductor IEM20–0, the call signal is supplied on conductor PRBL and a signal of request for writing in is delivered onto conductor INBL. Memory ME responds by performing the requested write in operation. Afterwards, it delivers the earth onto conductor FOM, which resets flip-flop circuits DA and OM.

To communicate with scanner EX, block BL includes a call gate *pt*4, four addressing gates *pt*3–0 and the two registers I and N.

When gates *pt*3–0 are made conductive by condition FDT, the position of counter X is displayed on conductors G13–0 and designates a group of lines to be observed. Scanner EX gets oriented onto this group of lines. It enables interrogating selectively 16 groups with up to 16 lines each.

When, a short while later, conditions FDT and *q*2 are met, gate *pt*4 operates and sends a read out control (earth) over conductor EET. In exchange, the scanner transmits two indications which characterize the states of the 16 lines of the group: the first one, which is transmitted over conductors EP–0 and received by flip-flop circuits I15–0 of register I, indicates which lines are in state 0; the second one, transmitted over conductors EN15–0 and received by flip-flop circuits N15–0 of register N, indicates which lines are in state 1. Normally, these indications should be complementary since one same line cannot be both in state 0 and in state 1 at a time. However, if state 0 corresponds to a positive potential, and state 1 to a negative potential, it is also possible that the line, in process of changing its state, be at a null potential. Two thresholds of voltage have therefore been defined. It will be agreed that, short of one of the thresholds, the line is in state 0. Between the two thresholds, the line is neither in state 0 nor in state 1. Beyond the second threshold, the line is in state 1. This example of operation justifies a double transmission of the state of a line; there are others and, in practice, the reception of the four combinations 00, 01, 10, 11 on a conductor EP and its homologue EN will have to be anticipated. The first and last combinations characterize indefinite intermediary states not to be taken into account. Combination 01 indicates that the line is unmistakably in state 0 and combination 10 indicates that it is unmistakably in state 1.

In description made with respect to FIG. 1, it was explained how block BL performed functions DT (detection of transitions) and TT (processing of transitions) alternately, according to the position of a flip-flop circuit MTT. This flip-flop circuit is found again in the diagram of FIG. 3.

If flip-flop circuit MTT is in position 0, its outlet 1 is earthed and disables gate *pt*7 which supplies a positive signal $\overline{FTT}$ to gate *pt*8. Condition FTT controlling the execution of function TT is not supplied. On the other hand, outlet 0 of flip-flop circuit MTT is positive and, assuming that gate *pt*9 is non-conducting, gate *pt*5 operates, thus delivering an earth to gate *pt* 6 which in turn supplies condition FDT. The execution of function DT is controlled.

If, in the same conditions, flip-flop circuit MTT is in position 1, condition FTT is supplied instead of condition FDT and controls the execution of function TT.

The detailed operation of control block BL of FIG. 3 is now going to be described while beginning by function DT (detection of transitions), which is described by the table of FIG. 4. Function TT will be described further on with reference to FIG. 5.

These two tables are of similar design. They include, from left to right, the function reference, line numbers, the essential logical conditions which cause the realization of operations, the time when operations take place (position of the sequential circuit) and an enumeration of performed operations. Each line corresponds to one or more operations done at a time.

To a certain extent, the tables of FIGS. 4 and 5 can be considered as corresponding to the detailed diagram of embodiment of block BL. By using these two tables effectively, there can be easily established: a list which indicates, for each circuit element, the operations wherein it takes a part as a data emitter; a list which indicates, for each circuit element, the operations wherein it takes a part as a data receiver; a list of the necessary operators for performing the anticipated operations. Besides, these operations are clearly defined (sources of data, types of operations, data receivers) and are well known in the technique (loading, unloading of registers; incrementation, decrementation of a binary number; sums and products of data according to the Boolean algebra, etc.), as also the means for realizing them. Consequently, it is right to say that these tables constitute a particular mode of representation of detailed logical circuits. They offer the advantage of permitting a clear description of a complex logical system.

It will be assumed that, initially, flip-flop circuit MTT is in position 0. It tends to make gate *pt*5 operate. It will also be assumed that flip-flop circuit S11 is in position 0, and also the flip-flop circuits of counter X. It follows that gate *pt*9 receives conditions $\overline{S11}$, $\overline{X3}$, $\overline{X2}$, $\overline{X1}$, $\overline{X0}$ and operates. It does not supply condition *fdt* but an earth which disables gate *pt*5. The latter supplies condition $\overline{FDT}$ and gate *pt*6 operates, so that condition FDT is not supplied. On another hand, flip-flop MTT disables gate *pt*7 which supplies $\overline{FTT}$ and gate *pt*8 operates, so that condition FTT is not supplied either. The coincidence of conditions $\overline{FDT}$ and $\overline{FTT}$ causes gate *pt*10 to operate and disables sequential circuit Q.

It will be assumed that the other flip-flop circuits and registers are in position 0. On the contrary, time basis generator BT operates and delivers impulses T which are transmitted to sequential circuit Q, as well as impulses *rz* having the same time-length as impulses T, but separated by 312μs. Counter B, as for itself, is in any position and progresses of one unit at each impulse *rz*.

Block BL is therefore in waiting position and performs no function.

Now, it will be assumed that time basis generator BT delivers signal *rz*. This signal sets flip-flop circuit S11(1 ⟶ S11) and causes counter B to step once (B+1 ⟶ B). These operations are indicated on line 1 of the table of FIG. 4.

The line 2 of the table indicates that condition *fdt* is supplied as soon as one of the conditions X3, X2, X1, X0, S11 is present. It is thus supplied as soon as flip-flop circuit S11 is passed to position 1.

Flip-flop circuit MTT being in position 0 as previously assumed, condition $\overline{\text{MTT}}$ is present. Therefore, as indicated by line 3 of the table, condition FDT is produced (FDT = 1). It controls function DT to be performed. Conductors G13–0 receive the position of counter X immediately. Effectively, as can be seen on FIG. 3, gates *pt*3–0 receive condition FDT and also conditions X3–0. Those of these gates which correspond to set flip-flop circuits of counter X operate and supply the earth, whereas those which correspond to flip-flop circuit of the counter in position 0 remain non- conducting and deliver position potential. The counter position thus is transmitted to scanner EX, over conductors G13–0 (with inversion). The value of the address thus transmitted to scanner EX is 0, since counter X is in position 0. It orientates the scanner onto line group *gr*0, as has been indicated in the description relating to FIG. 1.

When condition $\overline{\text{FDT}}$ is removed, gate *pt*10 becomes non-conducting and releases sequential circuit Q. Afterwards, as soon as time basis generator BT delivers an impulse T, sequential circuit Q delivers time impulse *q*0, or, said more simply, time *q*0, and then it steps to position 1. This stepping to 1 is noted on line 4; it is underlined, for it characterizes the actual start of function DT. All the determining operations (opening or closing of a function) have also been underlined in the tables of FIGS. 4 and 5.

At time *q*0, registers A and M are also reset to 0 (if need be).

At time *q*1 (line 5), without any condition (not mentioning condition FDT which is necessary for all operations), registers I and N are reset to 0 (if need be).

At the same time *q*1 (line 6), if flip-flop circuit S11 is in position 1, as previously assumed, counter X is also reset to 0 (if need be).

At time *q*2 (line 7), flip-flop circuit DA is set; a constant *Ct*1 and the position of counter X are written on register A. Flip-flop circuit DA delivers a signal onto conductor PRBL in order to call memory ME (FIG. 3). Constant *Ct*1 is the initial address of memory MGR (FIG. 1) in memory ME. The position of counter X, added to *Ct*1, enables designating one of the cells of MGR. The initial address of memory MGR may advantageously be such that its four bits of low weights be 0, so that constant *Ct*1 should supply the 11 high weight bits and that counter X should supply the four low weight bits, the adding process being thus reduced to a mere juxtaposition. Counter X being in position 0, the address written on register A, and noted (MGR) on line 7 of the table, is that of memory cell *mg*0 assigned to group *gr*0, as indicated in the description relating to FIG. 1.

Still at time *q*2 (line 7), a signal is transmitted over conductor EET (EET = 0), in order to control scanner EX to supply the information indicating the states of the lines of the group designated by the address transmitted over conductors G13–0. In fact, this condition is issued from gate *pt*4 (FIG. 3) which removes condition EET at coincidence FDT-*q*2. This is why this signal is noted EET = 0.

Moreover, at time *q*2 equally, flip-flop circuit S11 is reset.

Flip-flop circuit DA having been set to request an operation from memory ME, remains in position 1 as long as the requested operation is not performed. It supplies a condition DA which, as previously indicated, disables a portion of time basis generator BT and inhibits the generation of impulses T. Due to this, the operation of block BL is suspended.

It will be assumed that scanner EX, when interrogated by the signal transmitted over EET, is capable of supplying the requested information element in a time which is always shorter than the response delay of memory ME. Due to this, the information element supplied by scanner EX and indicating the state of a group of lines, is received by control block BL (line 8), before the read out operation is completed. This information element is twofold, as previously indicated. It includes 16 bits transmitted over conductors EP15–0 and registered by flip-flop circuits I15–0 of register I; they indicate which lines are in state 1. It also includes 16 bits transmitted over conductors EN15–0 and registered by the flip-flop circuits N15–0 of register N; they indicate which lines are in state 0.

When the read out requested to memory ME is over, a group word read out of memory cell *mg*0 (FIG. 1) gets written on flip-flop circuits M20–0 in register M (FIG. 3). This word is represented by FIG. 6. It is seen to include: one bit of rank 20, called *a*, indicating the alphabet used on the lines of the group (two possible types of alphabet); a bit of rank 16, called *v*, indicating the transmission speed adopted on the lines of the group (two possible speeds); 16 bits of ranks 15 to 0, called EA and indicating what were the states of the lines of the group at the time of the previous scanning. These data get written on the flip-flop circuits of corresponding ranks in register M, as indicated on line 9 in the table of FIG. 4. Practically at the same instant, memory ME delivers a signal FOM which is noted on the same line as a time signal and resets flip-flop circuit DA.

Once flip-flop circuit DA is reset, time basis generator BT can resume working normally and, at the first impulse T, sequential circuit Q delivers time *q*3.

At time *q*3 (line 10), bits *a* and *v* (M20 and M16) are recorded in register N (flip-flop circuits N20 and N16).

At time *q*4 (line 11), information EA displayed by M15–0 is up-dated according to the information EN and EP supplied by scanner EX (FIG. 1) and registered by I15–0 and N15–0.

Considering any line *i* of group *gr*0, the information relative thereto are written on flip-flop circuits M*i*,I*i* and N*i*. If line *i* was previously in state 0, then M*i* = 0. The position M*i* should be changed only if the line is now effectively in position 1, that is, if I*i* = 1 and N*i* = 0. In all other cases, when the line remained in state 0 or is in an indeterminate state, flip-flop circuit M*i* must remain in position 0. Consequently, flip flop M*i* must change position when coincidence $\overline{Mi}.Ii.\overline{Ni}$ is found. Similarly, if the line was previously in state 1, then M*i* = 1. M*i* must be changed only if the line is presently in actual state 0, that is, if I*i* = 0 and N*i* = 1. In all other cases, flip-flop circuit M*i* must remain set. Hence, flip-flop circuit M*i* must also change position if coincidence $Mi.\ \overline{Ii}.\ Ni$ is found.

The flip-flop circuits of register M are in fact binary counters and the triggering inlet of flip-flop circuit M*i* has been called TM*i*. The preceding considerations therefore explain equation $TMi = \overline{Mi}.\ Ii.\ \overline{Ni} + Mi.\ \overline{Ii}.\ Ni$, of line 11; it simply indicates that a triggering control is supplied to each flip-flop circuit among M15–0 which corresponds to a line having changed state for certain, thus enabling the formation of a new previous-state indication NEA to the purpose of its being put in place of the indication having been read out of memory ME.

Simultaneously, still at time *q*4 (line 12), the three bits relating to line *i* are combined in another way, so as to set flip-flop circuit I*i* if the line considered has changed its state (transition condition) or to reset it in all other instances.

If flip-flop circuit I*i* is in position 0, it must be caused to be set only if the line is actually in state 0 (N*i* = 0) and was previously in state 1 (M*i* = 1), which provides a first triggering condition $Mi.\ \overline{Ii}.\ Ni$.

If flip-flop circuit I*i* is in position 1, it must be left in that position only if the line is actually in state 1 (N*i* = 0) and was previously in state 0 (M*i* = 0). Hence, it must be caused to trigger when N*i* = 1 or when M*i* = 1, which provides the second triggering condition I*i* (M*i* + N*i*).

The flip-flop circuits of register I*i* are also binary counters and the triggering inlet of flip-flop circuit I*i* has been called TI*i*. The preceding considerations explain the equation $TIi = Mi. \overline{Ii}. Ni + Ii (Mi+Ni)$, of line 12; it simply indicates that a triggering control is delivered to each one of flip-flop circuits I15–0, so that, when a flip-flop corresponds to a line having changed its state, it finds itself in position 1, thus enabling the formation of an element of information LA signalling the detected transitions.

At this instant, if any of flip-flop circuits I15–0 is in position 1, that is if there is at least one transition condition, a detection circuit operates and provides a condition $\overline{LAP}$. In fact (FIG. 3), this circuit is a gate *pt*11 controlled by $\overline{I15}, \overline{I14}, \ldots \overline{I00}$; its output is therefore equal to $\overline{I15.I14 \ldots I00}$, which does correspond to I15 + I14 +. . . I00, according to the rules of the Boolean algebra. When gate *pt*11 supplies condition LAP, gate *pt*12 operates and does not supply $\overline{LAP}$.

As in the description made with FIG. 1, it will be assumed first that no transition is detected in group *gr*0. Condition LAP is consequently not produced.

At time *q*5 (line 15), the contents of counter X is increased by one unit (progression control *av* in FIG. 3). It steps to position 0001 and now designates group *gr*1. Simultaneously, sequential circuit Q is returned to position 0 and indicates the end of function DT. The next time pulse delivered by sequential circuit Q will therefore be *q*0.

Control block BL thus finds itself again in the state defined by lines 1, 2 and 3 of the table of FIG. 4. It will be noted that flip-flop circuit MTT remained in position 0, which will allow function DT to be repeated. Scanner EX receives the new position taken by counter X and starts interrogating line group *gr*1 (FIG. 1). As soon as sequential circuit Q delivers time impulse *q*0, operation is resumed exactly as just described.

As long as no transition has been detected, control block BL thus repeats function DT and scans the line groups one after the other. If no transition is detected, in any group, counter X finally gets back to position 0, after the last group has been scanned. Gate *pt*9 then operates and disables gate *pt*5 which restores condition $\overline{FDT}$ while controlling gate *pt*6 to operate and remove condition FDT. Control block BL now finds itself in its initial state, in waiting position.

There is now going to be taken in consideration the case when, during the scanning of group *gr*0, two transitions are detected on the first and last lines of the group respectively. It will be assumed that the first line passed from 1 to 0, at the beginning of the "START" of a character, and that the last line passed from 0 to 1, between the second and the third unit-elements of a character.

During the up-dating operation described on line 11 of the table of FIG. 4, flip-flop circuit MO (line 0) passed from 1 (previous state) to 0 (observed state). Also, flip-flop circuit M15 (line 15) passed from 0 to 1.

Simultaneously, the operation described by line 12 in the table results in the setting of flip-flop circuits I0 and I15, while all the other flip-flop circuits of register I remain in or have passed to position 0. Condition LAP is supplied.

Consequently, at time *q*5 (line 13 instead of line 15), flip-flop circuits DA and OM are set. These circuits deliver signals over conductors PRBL and INBL in order to ask memory ME a write operation. The address still is that which was loaded into register A at time *q*2 (line 7), that is the address of the group memory cell *mg*0. The word to be registered is displayed over conductors IEM20–0 by register M. This is the group word initially read out of *mg*0 and then up-dated at time *q*4.

Still at time *q*5, flip-flop circuit MTT is set while sequential circuit Q is brought back to 0.

Flip-flop circuit MTT then disables gate *pt*5, so that condition FDT is removed and enables gate *pt*7 which stops supplying condition $\overline{FTT}$, while condition FTT is supplied instead.

Control block BL is now ready to step to function TT (transition processing). However, as long as the write in operation is not completed, flip-flop circuit DA is in position 1 and inhibits time basis generator BT. Block BL remains therefore waiting. Once the writing is completed, the memory delivers signal FOM which resets flip-flop circuits DA and OM, thus starting the time basis and enabling function TT to take place.

The operation of control block BL in the carrying out of function TT is therefore going to be described now, mainly in connection with FIG. 3 and the table of FIG. 5. This table is designed similarly to that of FIG. 4.

Line 1 of table TT recapitulates the information being available in control block BL at the time when function TT begins.

Counter X always indicates the number of the line group wherein at least one transition has been detected. This number has been called NGL.

Register I indicates the lines whereon a transition has been detected, the corresponding flip-flop circuits being in position 1. The corresponding indication is called LA.

Flip-flop circuit N20 of register N indicates which alphabet is used on all the lines of the group. Two alphabets are provided for. In the chosen example, if flip-flop circuit N20 is in position 0, the alphabet has 7 unit-elements; if flip-flop circuit N20 is in position 1, the alphabet has 5 unit-elements. The corresponding indication is called *a*. To begin with, it will be assumed that N20 =0(7-unit alphabet).

Flip-flop circuit N16 of register N indicates the transmission speed adopted on all the lines of the group. Two speeds are provided for. In the chosen example, if flip-flop circuit N16 is in position 0, the speed is 200 bauds; if flip-flop circuit 16 is in position 1, the speed is 50 bauds. The corresponding indication is called *v*. To begin with, it will be assumed that N16 = 0(200 Bd).

Lastly, condition FTT is supplied, as already indicated.

At time *q*0 (line 2), registers A and M are reset to position 0, as also flip-flop circuits N14–0 of register N.

At time *q*1, in case when N16 = 0 (line 4), an indication NLA is created on flip-flop circuits N13–10 of register N, while position of counter B (stages B8–0) is written on flip-flop circuits N8–0.

Under the form of a 4-bit binary number, indication NLA is the number of the first line whereon a transition was detected. This indication is created as from indication LA having been registered in I. This can be done in several manners. For instance, an exclusion circuit enables establishing, as from the contents of register I one condition among 16 which indicates the first line being in transition state, said condition directly controlling the triggering of flip-flop circuits N13–10, at time *q*1 of function TT.

Counter B is used as a clock that gives the time of the events being taken in consideration by clock BL and, more particularly, of the transitions detected on the lines. It is controlled by signal *rz* originating from time basis generator BT every 312th *s*. Thus its stage BO triggers every 312th *s* and its stage B4 triggers approximately every 5th ms, etc. The transfer of B8-0 into N8-0 enables recording the present time HT, i.e., the time of the transitions which have just been detected. Since at 200 Bd a unit-element lasts for 5ms, it is seen that the time written on N8-0 is expressed in unit-elements when considering information part B8-4 which comes onto N8-4, and in 1/16th of a unit-element when considering information part B3-0 which comes onto N3-0.

At time *q*2 (line 5), flip-flop circuit DA is set in order to call memory ME (read out). An address is formed on register A. It includes a constant C*t*2 which is the initial address of memory MLR (FIG. 1) in memory ME. This constant will advantageously include 7 high-weight significant bits, the 8 low-weight bits being 0. It is complemented by 4 bits delivered by counter X (number of the line group) and by 4 bits delivered by flip-flop circuits N13–10 (number of the line in its group). The address thus formed designates a memory cell proper to the considered line, such as cell *m*L1 of FIG. 1. In a general manner, this address is noted MLR, on line 5.

When reading out is done, signal FOM resets flip-flop circuit DA (line 6) whereas register M receives a line word represented by FIG. 7. This indication includes : a time of origin HS received by M8-0; character CAR in process of being received by M15-9 ; a distortion indication DIS received by M18-17 ; an indication EJ the function of which will be stated more precisely further on and which is received by flip-flop circuit M20.

At time $q3$ (line 7), the time of origin HS (M8-0) is withdrawn from the time of the transition to be processed HT (N8-0). Difference HT-HS indicates the length of time which elapsed between the time of origin HS and the time of transition HT, in unit-elements for information block N8-4 and in 1/16th of unit-element for information block N3-0.

At time $q4$ (line 8), difference HT-HS is used for reconstituting character CAR in view of the new transition-an operation noted RCN → M15-9- and for up-dating the distortion indication DIS —an operation noted MJD → M18-17.

Figures 8, 9:
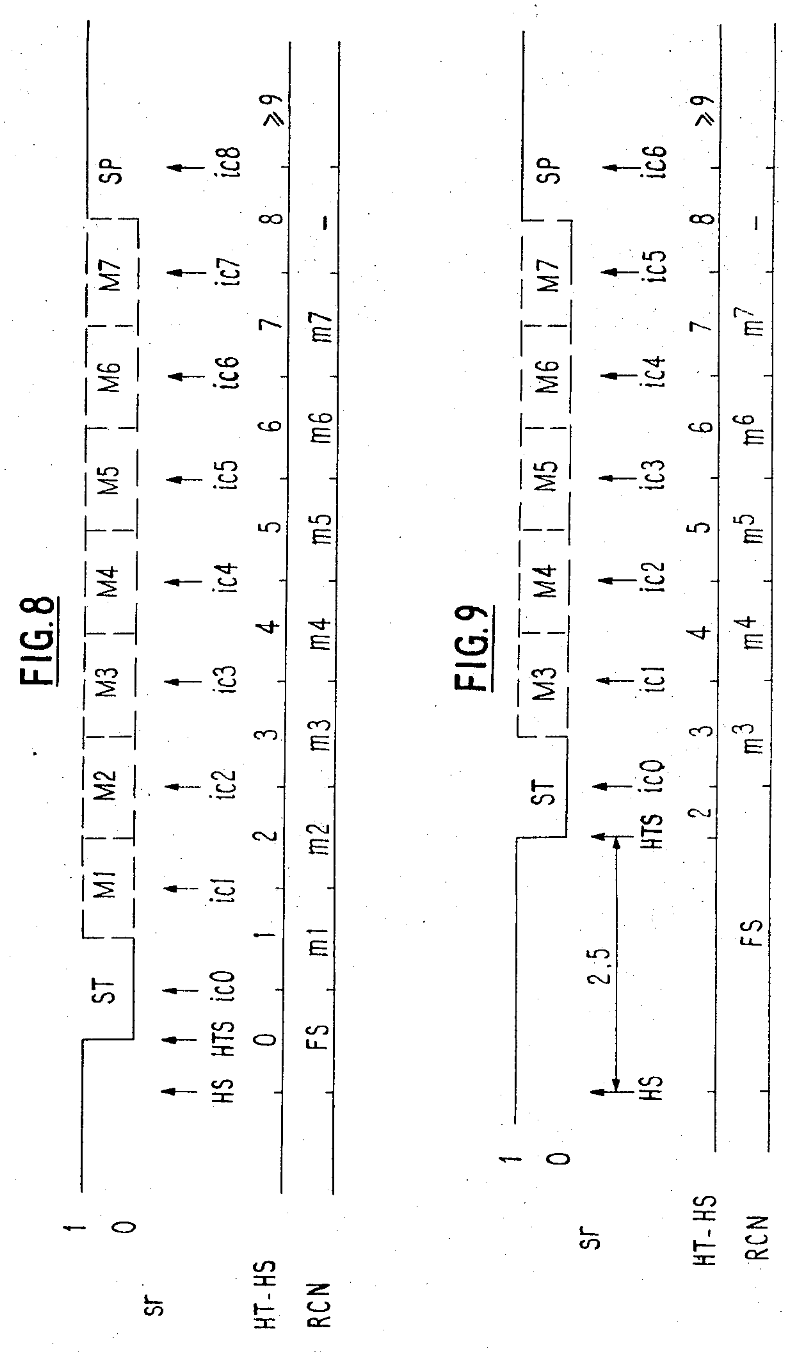
FIG. 8, a 7-significant unit telegraph character and the operations performed with each transition.
FIG. 9, a 5-significant unit telegraph character and the operations performed with each transition.

There will be first described, by referring to FIG. 8, how the operations performed in $q3$ and $q4$ enable the character to be reconstituted.

There is represented, on line *sr* of FIG. 8, a 7-unit character including one "START" ST, 7 significant unit-elements M1 to M7, one "STOP" SP. Initially the telegraph line is in state 1. It passes to state 0 at the characteristic instant HTS, at the beginning of the "START." As soon as this transition is recognized by control block BL, by means not described now, line memory cell *m*L1, for instance, is up-dated (see FIGS 1 and 7 ). This consists in resetting information EJ, DIS and CAR to 0 and in computing a time of origin HS which is obtained by withdrawing the time-length of half a unit-element from HTS.

The time of origin HS is shown facing line *sr*, on FIG. 8. On the same line here are also shown instants *ic*0 to *ic*8 being each located in the middle of the theorical "START, " 7 unit-elements and "STOP." Below, on line HT-HS the value (in decimal notation) of difference HT-HS has been indicated while disregarding the four bits of lower weights, which corresponds to an integer of unit-elements (without the fractions). Line RCN indicates the operations to be done.

A "START," to be accepted as such, must have a time-length longer than half a unit-element. Consequently, after the initial transition (HTS), the first transition must appear after instant *ic*0. If the first transition appears before *ic*0, the difference between the time of that transition (HT) and the time of origin HS, such as made at time $q3$, gives an integer of unit-elements equal to 0. With respect to the reconstituting of the character, the deduction is made that this is a false "START" and the fact is recorded by FS on line RCN. No operation is carried out on indication CAR (M15-9) which remains at zero. The case of a false "START" will be dealt with further on.

If the first transition following HTS occurs between instants *ic*0 and *ic*1, it must be considered that, effectively, this is the transition separating the "START" from a unit-element M1 equal to 1. The calculation HT-HS results precisely in an integer of unit-elements equal to 1 and this will provide the indication that the transition precedes unit-element M1. The unit-elements following the "START," as from and including M1, will not be 0, but 1, and this until a new transition occurs. Consequently, the process of reconstituting a character, noted as $m1$ on line RCN, will consist in triggering flip-flop circuits M15–9 so as to set them to position 1 instead of 0.

When the first transition following HTS occurs between the characteristic instants *ic*3 and *ic*4, the calculation HT-HS results in an integer of unit-elements equal to 4. The process of reconstituting a character, noted as $m4$, will in that case consist in setting only flip-flop circuits M12–9 while flip-flop circuits M15–13 will remain in position 0, this being effectively the state of the line during the period of time that covered the "START" and the first three unit-elements M1 to M3.

On the other hand, if the first transition occurs between *ic*0 and *ic*1, as described before, flip-flop circuits M15–9 are triggered to position 1. Then, if a second transition occurs between *ic*3 and *ic*4, indication CAR read out and displayed by M15-9 will be 11 . . . 1. The character reconstituting process $m4$ will always consist in triggering flip-flop circuits M12–9 and the result will be 1110000. This does correspond to the successive states of the line which, after it got to state 1, just after the "START," comes back to state 0 at the beginning of unit-element M4.

Generally, when a transition occurs, the calculation HT-HS, by defining the integer of unit-elements which elapsed since the time of origin HS and must remain unchanged, thus enables a simple reversal of the following unit-elements' values, by controlling the flip-flop circuits among M15–9 whereon these unit-elements are written to be triggered. On line RCN, the corresponding controls are noted $m1$ to $m7$. Control $m1$ causes all flip-flop circuits M15–9 to be triggered. Control $m2$ causes flip-flop circuits M14–9 to be triggered . . . and control $m7$ causes the triggering of flip-flop circuit M9 only.

If a transition occurs after characteristic instant *ic*7, no control is formed. This is the beginning of the "STOP" or, after *ic*8, the beginning of the "START" of the following character. This latter case, wherein a new time of origin must be calculated, will be dealt with further.

There is no necessity for describing the circuits enabling the operations for reconstituting character RCN. These circuits are controlled by flip-flop circuits N8–4 which supply a number of unit-elements according to difference HT-HS. They decode the indication and, if appropriate, after time $q3$ when this difference is calculated, supply one of the seven control signals for character reconstituting $m1$ to $m7$ which are defined on line RCN of FIG. 8. At time $q4$, the thus supplied control signal $m1$ causes triggering of flip-flop circuit M15-9, or control signal $m2$ causes triggering of flip-flop circuits M14–9 . . . , or control signal $m7$ causes triggering of flip-flop circuit M9. The reconstituting of character RCN is thus performed in accordance with the method having just been described with reference to FIG. 8. An illustration of this method for reconstituting a character and of the means required to use it will also be found in the French Pat. No. 1,386,330 mentioned in the preamble of the present description.

The operations for up-dating indication DIS also take place at time $qr$. This indication includes two bits received by M18-17 and being 00 at the beginning of a character. When a first transition is detected, between *ic*0 and *ic*1 for instance, difference HT-HS as already indicated includes a fractional portion supplied by flip-flop circuits N3–0. It is seen on line *sr* in FIG. 8 that the transition should normally appear at equal distances from *ic*0 and *ic*1. The value of the fractional portion should therefore be ½. However, the distortion may shift the transition, either towards *ic*0, in which case its value is less than ½, or towards *ic*1, in which case its value is more than ½. The value supplied by N3-0 just has to be decoded, in an appropriate manner according to the operation requirements, for supplying three conditions corresponding, e.g., to a distortion ranging between 32 and 38 percent, between 38 and 44 percent, or above 44 percent. In the absence of such conditions, the distortion is less than 32 percent and flip-flop circuits M18–17 are left in position 0. When one of the three conditions is supplied, the position of flip-flop circuits M18–17 is modified, so that in the three preceding cases they display 01, 10 and 11.

When detecting a second transition, the distortion is evaluated in the same manner. It may, however, be provided that information DIS should be modified only if the distortion was increased, a comparison between the condition supplied by the decoding of the position of flip-flop circuits N3–0 and the condition relating to flip-flop circuits M18–17 inhibiting a modification of information DIS if the noted distortion is smaller than the previously noted one.

For the sake of simplification, the circuits for performing operations RCN and MJD have not been described in detail. The foregoing descriptions are amply sufficient to help finding them easily.

At time $q5$ (line 11), flip-flop circuits N8-0 ) of register N are reset.

Still at time $q5$ (line 12), since condition $\overline{NS}$ (this is not a new "START") is assumed to be supplied, flip-flop circuit DA is set for a call to memory ME. Flip-flop circuit OM is set for requesting a write operation. The address is the same as at time $q2$, that is the address of line memory $m$L1. Simultaneously, the indication displayed by N13–10, that is the number of the line having just been processed (NLA), is used to reset the corresponding flip-flop circuit I. This operation is noted as $0 \rightarrow Ii$ (NLA). It enables canceling the corresponding transition condition in indication LA.

It should be recalled that register M still contains the word read out of memory cell $m$L1 (FIG. 1), modified by the reconstituting of character CAR and by the up-dating of distortion DIS. The requested write operation is thus performed and permits up-dating the line word in $m$L1 (line 13).

After the writing, the memory delivers signal FOM which resets flip-flop circuits DA and $\overline{OM}$.

At time $q6$, condition $\overline{NS}$ being present, sequential circuit Q is returned to position 0.

Assuming that at least a transition condition remains in indication LA, condition $\overline{LAP}$ is not supplied. Control block BL therefore remains in state, i.e. in function TT, since condition FTT is still supplied. It resumes operation as from $q0$, as has just been described, with the only difference that indication LA no longer contains any trace of the transition having just been processed.

Processing of a second transition can be done exactly in the same manner as for the first one, assuming that this transition neither characterizes a new "START" nor a false "START." At time $q5$, the bit characterizing this transition in indication LA, is reset to 0. If, as assumed, only two transitions have been detected, all the bits of LA are in position 0. Condition LAP which was mentioned in the description of function DT (time $q4$) disappears and condition $\overline{LAP}$ is supplied by gate $pt$12.

In those conditions, at time $q6$ (line 15), flip-flop circuit MTT is reset while the contents of counter X is increased by one unit. These two operations which come in addition to the returning of sequential circuit Q to 0, switch control block BL back to function DT for the scanning of the following group of lines.

The case precedingly dealt with (first line of the first group having line memory $m$L1, 7-unit alphabet, speed 200 Bd) will now be resumed while assuming that the detected transition marks the beginning of a new "START."

The operations performed in function TT are the same as before, up to time $q$4. Difference HT-HS, in particular, is worked out at time $q3$. The number of unit-elements indicated by this difference (flip-flop circuits N8–4) is equal or superior to 01001, that is 9 in decimal notation. It is effectively seen by referring to FIG. 8 that a character extends over 9 unit-elements, as from the time of origin HS up to the characteristic instant $ic$8. Any transition occurring after characteristic instant $ic$8 must be considered as the beginning of a new "-START." The value of difference HT-HS then is equal to or greater than 9 unit-elements. A simple decoding circuit enables finding this fact out and, as indicated by line 10, it controls the setting of flip-flop circuit N14 in register N, that is the writing of indication NS on this flip-flop.

The presence of condition NS, or rather the absence of its complementary condition $\overline{NS}$ is going to modify the end of the operating process.

Effectively, at time $q$5, through flip-flop circuits N8–0 are reset (line 11), the absence of condition $\overline{NS}$ inhibits calling memory ME (line 12) and up-dating the line memory. In register I, the bit characterizing the transition being processed is kept on 1. Due to this, condition $\overline{LAP}$ cannot be produced. At time $q$6, the operations described by lines 14 and 15 and meant for controlling either function TT to be repeated as from $q$0, or function DT to be resumed, are not performed.

On the other hand, still at time $q6$ (line 17), condition $\overline{N16}$ being present (speed 200 Bd), time HT is re-written on flip-flop circuits N8–0 of register N, while flip-flop circuits M8–0 are reset.

Afterwards, sequential circuit Q progresses normally and gets in $q$7.

At time $q$7 (line 18), flip-flop circuit M3 is set. It is recalled that flip-flop circuits M8–0 previously received the time of origin HS, expressed in unit-elements (M8–4) and fractions of unit-elements (M3–0). They were reset at time $q$6 and, by setting flip-flop circuit M3 there is written a time-length equal to half a unit-element on these flip-flops. This operation prepares the calculation of a new time of origin HS, in accordance with what was indicated with reference to FIG. 8. On line 18, the indication written on M8–0 is noted DM.

At time $q$8 (line 20), the contents of M8-0 is withdrawn from the contents of N8-0, just as at time $q$3, and the result, formed on N8-0, is HS = HT–DM, that is, referring to FIG. 8, the time HTS of the first transition of a "START" less half a unit-element.

At time $q$9 (line 21), flip-flop circuits M8–0 are reset.

At time $q$10 (line 22), the contents of N8-0 (HS) is transferred into M8-0.

At time $q$11 (line 23), flip-flop circuits N9–0 are reset.

At time $q$-12 (line 24), indications EJ, DIS, CAR which were preserved up to now by flip-flop circuit M20, M18–17 and M15–9 are written on flip-flop circuits N9–0.

At time $q$13 (line 27), flip-flop circuits DA and OM are set so as to send a call to memory ME for a write operation. At the same time, flip-flop circuits M20, M18–17 and M15–9 are reset.

The address is that still detained in register A, that is the address of the line memory cell ($m$L1, FIG. 1, in the example described). The element of information to be written, formed on register M, solely includes 0's, for EJ, DIS, CAR, and also the new time of origin HS calculated at time $q$8.

The write in takes place (line 28) and signal FOM resets flip-flop circuits DA and OM.

At time $q$14 (line 29), registers A and M are reset.

At time $q$15 (line 32), flip-flop circuit DA is set again, so as to call memory ME for a read out operation. At the same time, a constant C$t$3 is loaded into register A. This constant is the address of a memory cell CS (FIG. 1).

The read out takes place (line 33) and the word contained in memory cell CS gets written on register M. This word includes an address, called ACER, of a memory cell of waiting queue FAR wherein the received and fully reconstituted characters are filed. The utilizing equipment will come and read the characters reconstituted by block BL out of this waiting queue and will use them according to requirements. This waiting queue is the only communication link of block BL with the other equipment of the system wherein it is incorporated.

The address ACER has 15 bits. The first 9 ones, received by M14–6, are constant, whereas the last 6 ones, received by M6–0, can take any possible value. The waiting queue thus includes $2^6 = 64$ consecutive addresses which are cyclically used in turn for the registering of reconstituted characters. It is calculated, taking into account the traffic and the operating speed of the utilizing equipment, in such manner that it shall never be filled up.

At time $q$16 (line 34), flip-flop circuits DA and OM are set so as to call memory ME for a write in operation. At the same time, the value contained in flip-flop circuits M6–0 of register M, that is the variable portion of address ACER is increased by one unit (ACER + 1).

Then, the requested write operation takes place (line 35). It enables re-writing the read-out information element, plus one unit, into memory cell CS, thus preparing the filing in waiting queue of the next reconstituted character.

At time $q$17 (line 36), register A is set back to 0.

At time $q$18 (line 37), address ACER + 1 is transferred from M into A.

At time $q$19 (line 38), register M is returned to 0. At the same time, the bit which characterizes the processed transition is reset to 0, in register I, in the manner described before (time $q$5, line 12).

At time $q$20 (line 39), flip-flop circuits DA and OM are set so as to call memory ME for a write operation. At the same instant, an information element to be written in waiting queue is formed on register M. It includes: the distortion indication DIS and the reconstituted character CAR, both supplied by N8-0; the group number NGL, supplied by X3-0; the number NLA of the line in its group, supplied by flip-flop circuits N13–10. Lastly, sequential circuit Q is returned to position 0.

Then, the writing takes place, the information element formed on register M being written at the address ACER + 1. Flip-flop circuits DA and OM are reset (line 40).

Sequential circuit Q having been brought back to position O, whereas flip-flop circuit MTT remained in position 1 and counter X in position 0 (in the chosen example), control block BL resumes function TT, such as has just been described, as from time*q*0, with the only difference however that information LA recorded in register I contains no more trace of the transition having just been processed.

In case the processed transition is the last one having been detected for the considered line group, cancelling of the corresponding bit, which is performed at time *q*19 (line 38), restores condition $\overline{LAP}$. Hence, at time *q*20 (line 41), flip-flop circuit MTT is reset, whereas the contents of counter X is increased by one unit. As already indicated, this switches control block BL back to function DT so that scanning of the line groups may be resumed, as from the following group.

After dealing with the cases where the detected transition was inside a character, then at the beginning of a character, the case of a false "START" is now going to be considered, that is the case of a transition occurring less than half a unit-element after the beginning of a character. The example dealt with before will be treated again wherein a transition is detected on the first line of group *gr*0 (FIG. 1) whereto memory cell *m*L1 is assigned. This line is operated with the 7-unit alphabet and at the speed of 200 Bd.

Function TT is carried out normally up to time *q*4. At this instant, difference HT-HS as calculated at time *q*3—is such that the integral part of the number of unit elements is 0. By referring to FIG. 8, it can effectively be seen that if the first transition following HTS occurs before instant *ic*0, the value of HT-HS is 0 as regards the number of unit-elements. This number of unit-elements is displayed by flip-flop circuits N8–4.

In those conditions, at time *q*4 (line 9), flip-flop circuit M20 receives a control which causes it to be set, the triggering control TM20 being supplied by conditions $\overline{\mathbf{M20}}$ (flip-flop circuit M20 reset), $\overline{\mathbf{N8}}$, $\overline{\mathbf{N7}}$, $\overline{\mathbf{N6}}$, $\overline{\mathbf{N5}}$, $\overline{\mathbf{N20}}$ (speed 200 Bd) and $\overline{\mathbf{N4}}$. The information element registered by this flip-flop circuit has been called EJ in the foregoing.

Since bit EJ is made equal to 1 at time *q*4 (at the end of the time pulse), it has no action on NS at that time (line 10). Indication NS remains equal to 0 and, owing to $\overline{NS}$, the operations for up-dating the word contained in memory cell *m*L1 are performed normally, at time *q*5 (line 12, then 13), just as though a useful transition had been detected. At time *q*6 (lines 14 and 15), control block BL performs the operations that will enable it either to resume function TT from the beginning, in order to process another transition detected in the same group, or to return to function DT, in order to scan the following line group.

Referring to FIG. 8 again, it must now be considered that the just processed transition having led to the conclusion of a false "START" followed a transition which, as to itself, had been taken as a beginning of character and caused the previously described processing for a new "START." This processing includes, as known already, the filing of a reconstituted character in waiting queue FAR (FIG. 1). Hence, after the false "START," if the next detected transition must effectively be taken as the beginning of a new "START," there is no need for filing a reconstituted character in waiting queue, since this was done already. Bit EJ having just been set on 1 in memory cell *m*L1 of the processed line (FIG. 1) will permit obtaining this result.

There will be described now the processing of the same line at the first transition following the false "START." It is recalled that, in line memory *m*L1, bit EJ has the value 1, information DIS and CAR have any values not to be taken into consideration since they result from a false "START," while the time of origin HS is the time of beginning of the false "-START."

Function TT is performed normally up to time *q*4, as in all the foregoing cases of operation.

At time *q*4, as indicated by line 10, flip-flop circuit N14 is set (NS), since condition EJ supplied by M20 is present. Bit EJ thus enables considering the present transition as the beginning of a new "START," whatever the result of subtraction HT-HS.

Due to this, up-dating of the line memory word is not done at time *q*5, because of the absence of $\overline{NS}$.

At time *q*6 (line 16), a calculation begins of the time of origin HS which must be assigned to this new "START," as previously described. This calculation ends at time *q*10 (line 22). The operations described by lines 23 and 24 are performed normally at times *q*11 and *q*12, uselessly, but this is of no inconvenience.

Moreover, at time *q*12 (line 25), condition EJ being present, flip-flop circuit N14 (NS) is reset.

Hence, at time *q*13 (line 26), the bit characterizing the processed transition in register I is returned to position 0, according to the identity of this line (NLA) and in the manner already described, so as to cancel any trace of processed transition. It will be first assumed that one transition at least remains to be processed and condition $\overline{LAP}$ is not supplied.

Still at time *q*13, the memory is called for a write operation, while a word is prepared on register M. In that word, information EJ, DIS, CAR are null, whereas indication HS is the just calculated time of origin. This word is written in memory *m*L1 1) which finds itself again in the state following the detection of a new "START," as is necessary.

At time *q*14, sequential circuit Q is brought back to position 0, since information $\overline{NS}$ is present. Processing of the new "-START" following a false "START" is over. Bit EJ enabled omitting the operations for filing a reconstituted character in waiting queue which extend from time *q*15 to time 20, thus allowing for an appreciable time saving at a little cost, since this requires but one bit in the line memory cell and the circuits required for processing that bit in control block BL.

All the cases examined so far are those provided for processing the transitions detected on a line operated with the 7-unit alphabet, at a speed of 200 Bd. There is going to be considered now the case when, without changing the alphabet, the speed is 50 Bd.

It is therefore four times slower than at 200 Bd. This comes to say that all the events occuring on the line must be considered in relation to a scale of time four times more extensive, or in relation to a clock four times slower. Consequently, in a general way, every time a reference to time will have to be made, a clock comprised of the stages B10–2 of counter B will be used, stages B1–0 introducing the required division by 4.

As indicated in the description of function DT, the speed for each line group is specified by a bit *v* which gets written on flip-flop circuit N16. When the speed is 50 Bd, this bit *v* is 1 and flip-flop circuit N16 supplies condition N16. Condition $\overline{\mathbf{N16}}$ is absent.

The operation of control block BL is the same as that having just been described, in every case, with but two exceptions however : at time *q*1 (line 3 instead of line 4), the time of transition HT charged on flip-flop circuits N8–0 is supplied by stages B10–2 of counter B; at time *q*6, similarly, time HT charged on N8-0 is also supplied by B10-2.

Other speeds could still be provided for in the same manner, while using other clocks to supply the time. In cases when these speeds would not be binary multiples or sub-multiples of 200 Bd, appropriate counters would just have to be equipped.

Lastly, there is still to be considered the case of transitions being detected on lines operated with the 5-unit alphabet. Reference will first be made to FIG. 9 which represents, in the same way as FIG. 8: on line *sr*, a 5-unit character including "-START" ST, 5-unit-elements called M3 to M7 and "STOP"

SP; on line HT-HS, the value in unit-elements of difference HT-HS; and on line RCN, the controls given in consequence for reconstituting the character.

In fact, as shown by FIG. 9, the time of origin HS has been chosen to be calculated by withdrawing the value of 2.5 unit-elements from time HTS of the transition marking the beginning of the "START." The first transition occurs between instants *ic*0 and *ic*1 at the earliest. The value supplied by HT-HS then is 3, in decimal notation. The corresponding control is *m*3. It will reverse the bits of character CAR (FIG. 7), as from the bit representing M3, just as the case of a 7-unit character. The bits representing M1 and M2 —two unit-elements that do not exist in a 5-unit character—always remain 0 since difference HT-HS can never be less than 2. Should it be 2, then a false "START" would be concerned.

These few considerations are sufficient for describing the operation of control block BL in the carrying out of function TT, for a line operated with the 5-unit alphabet.

It is recalled that these lines are characterized by the fact that, in the information element read out of the group memory cell (FIG. 6) during function DT, bit *a* is 1. During function DT, this bit is written on flip-flop circuit N20 which therefore supplies condition N20.

From the explanations given while referring to FIG. 9, it appears that the transitions occurring inside a character are processed in the same manner, whether the alphabet is a 7-or 5-unit one.

The processing of 5-unit lines, as compared to the processing of 7-unit lines, is different on two points only: the calculation of HS must be done by withdrawing 2.5 unit-elements from HTS, instead of 0.5 unit-element; and the detection of false "START's."

This is why the first difference will appear in case the detected transition marks the beginning of a "START" (new "-START" NS) and, more particularly, in the calculation of the time of origin HS which takes place from time *q*6 to time *q*10. It is shown on line 19 of the table of FIG. 5. It is seen that according to this line, at time *q*7 while condition N20 is present, flip-flop circuit M5 is set, an operation which is also noted DM. This operation completes the one indicated on line 18 and enables writing a value corresponding to 2.5 unit-elements on register M (part M8-0). At time *q*8 (line 20), this value is withdrawn from the time of transition, thus supplying HTS—DM = HS. At time *q*10, the new time of origin HS has taken the place of the previous one on flip-flop circuits M8–0, with a view to its being written into the line memory cell.

There remains the case of a false "START." It is described by line 9, for a 5-unit character at the same time as for a 7-unit character. In effect, the detection of a false "START," such as described previously, must cause bit EJ to be put on 1, that is flip-flop circuit M20 to be set. As concerns a 5-unit character, the false "START" is characterized by the fact that difference HT-HS gives a number of unit-elements equal to 2 (see FIG. 10). Flip-flop circuit M20 is set to position 1, as indicated by line 9 of the table of FIG. 5, by a triggering control TM20 which is produced when conditions $\overline{M20}$ (flip-flop circuit M20 reset), $\overline{N8}$, $\overline{N7}$, $\overline{N6}$, $\overline{N5}$ and N20 are met.

The remaining operations are in all cases the same as those having been described for a line operated with a 7-unit alphabet.

Clearly, other alphabets can easily be provided for, by adding different other circuits into control block BL to the purpose of calculating HS and controlling flip-flop circuit M20 when a false "START" occurs.

What is claimed is:

1. A telegraph signal receiving arrangement including:
a plurality of incoming telegraph lines;
control means for performing a transition detection operation and a transition processing operation;
said control means including a switching circuit initially switched to the transition detecting position to enable scanning of said lines to detect transitions on said lines, and in response to at least one transition being detected, said switching circuit operates and switches said control means into the transition processing operation wherein it reconstitutes a part of a character to which each detected transition belongs, and in response to completion of the processing operation, said switching circuit operates again and switches said control means into the transition detecting operation; and
said control means further including a generator delivering pulses cyclically recurring at regular time intervals,
a scanning counter controlling a scanner for observation of the state of said lines, and
means during the transition detecting operation and in response to a cyclically recurring pulse to set said scanning counter in an initial position, such that the scanning of said lines begins with the lines having the highest transmission speed and continues with lines of lesser speed, until a new cyclical pulse resets the scanning counter to its initial position, or until all the lines have been scanned, and during the time provided for a cycle, the highest speed lines are always scanned.

2. An arrangement as claimed in claim 1, in which the time intervals between said cyclically recurring pulses which define the duration of the scanning cycles, are equal to the maximum time interval of observation of the highest speed lines.

3. An arrangement as claimed in claim 1, in which when in the transition detecting operation, said control means scans said lines in groups, so as to simultaneously detect transitions for all the lines of one group, and in which when several transitions are detected in one group, said control means repeatedly performs the transition processing operation for all such lines in a successive manner, whereafter the control means reverts to the transition detecting operation.

4. An arrangement as claimed in claim 3, in which said control means for the transition detecting operation includes:
a present-state register which receives, from the scanner, the present states of the lines of a group;
means to read from a memory a memory section for the group of lines concerned;
a register memory which receives a group word from said memory section, which group word contains the previous states of the lines of its group, and which was stored during a preceding scan;
means to compare the present and previous states, one by one, and supply a transition condition for any line having changed its state;
a transition register which receives and registers transition conditions; and
a detecting circuit controlled by the transition register and supplying a call signal when at least one transition has been detected, to cause said switching circuit to operate and switch over from the transition detecting operation to the transition processing operation.

5. An arrangement as claimed in claim 4, in which all the lines of one group operate with the same telegraph alphabet and transmission speed, said group word also providing an indication characterizing the alphabet and an indication characterizing the speed of the lines of the group, and means coupled to register said indications for use for the processing of transitions.

6. An arrangement as claimed in claim 5, wherein when said detecting circuit does not supply a call signal, said switching circuit remains in a same position, and wherein stepping means in said control means cause the scanning counter to step once and to initiate the transition detecting operation again for scanning the next line group.

7. An arrangement as claimed in claim 3, wherein said control means, after being switched to the transition processing operation, identifies one of the lines which has changed its state, as a result of the information element supplied by the transition register, and performs operations concerning the processing of the transition detected on the line and removes the transition condition concerning this line from the transition register; and wherein, when the detecting circuit still delivers the call signal, said switching circuit remains in the same state and the transition processing operation continues for processing another transition, and when the detecting circuit ceases to deliver the call signal, said switching circuit operates and switches the control means into the transition detecting operation.

8. An arrangement as claimed in claim 7, in which the operations for processing a transition take place with reference to a time scale, and said control means includes a plurality of clocks supplying as many time indications as there are transmission speeds; and said control means includes means for selecting the time indication as a function of said transmission speed indication which is registered during the performance of the transition detecting operation.

* * * * *